Nov. 5, 1940.    R. M. ROWELL    2,220,731
LONG SCALE FREQUENCY METER
Filed March 10, 1939
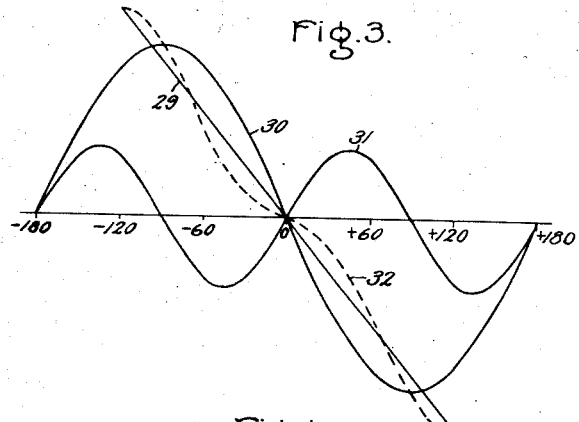
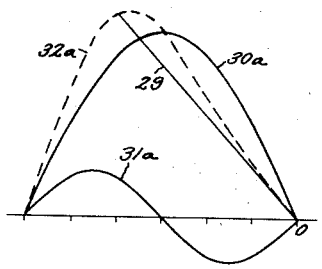
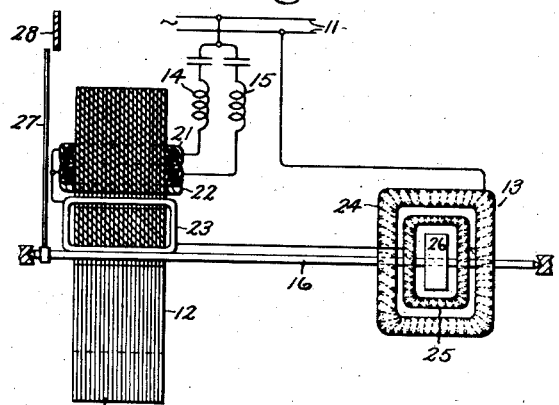
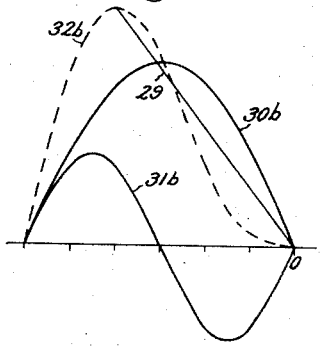
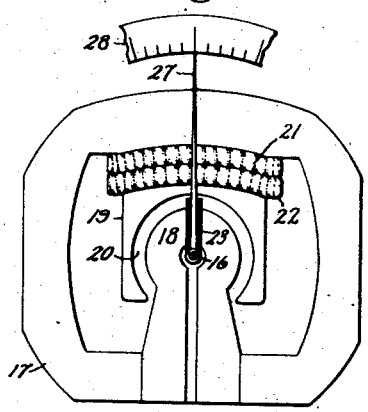
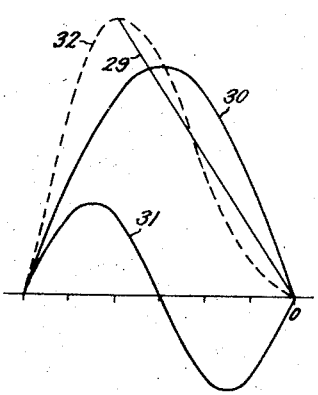
Inventor:
Ralph M. Rowell,
by Harry E Dunlap
His Attorney.

Patented Nov. 5, 1940

2,220,731

UNITED STATES PATENT OFFICE 2,220,731

LONG SCALE FREQUENCY METER

Ralph M. Rowell, Lynn, Mass., assignor to General Electric Company, a corporation of New York Application March 10, 1939, Serial No. 261,033

5 Claims. (Cl. 172—245)

My invention relates to electrical measuring and indicating instruments and concerns particularly instruments which are responsive to frequency of alternating current circuits.

It is an object of my invention to provide a highly efficient, positively acting frequency meter having a long scale exceeding 250 degrees and approaching 270 degrees in angular length.

Another object of my invention is to provide an improved frequency measuring device of the dynamometer type.

It is still another object of my invention to provide frequency responsive apparatus which may be manufactured conveniently and relatively inexpensively and in which the necessity for tapered air gaps or induction-disc elements may be avoided. Other and further objects and advantages will become apparent as the description proceeds.

In carrying out my invention in its preferred form I utilize a pair of resonant circuits of the conventional type tuned to frequencies above and below the range of frequencies which are to be measured by the instrument. A two-circuit current-responsive instrument mechanism is employed which is so connected to the resonant circuits that the currents in one resonant circuit act in opposition to those in the other resonant circuit and the resultant action of the instrument mechanism depends upon the relationship between the currents in the resonant circuits and, therefore, upon the magnitude of the frequency. However, I have utilized a new and different type of instrument mechanism for the purpose. I utilize a torque-producing or principal instrument unit which is of the long range dynamometer type, preferably exceeding 250 degrees in angular range and has a pair of field coils or a field coil with a center tap for connection to the resonant circuits. For producing restraining torque I provide an auxiliary instrument element which is of the modified dynamometer type having a pair of relatively movable current conducting coils acting in the manner of the usual 90-degree dynamometer instrument and having also a flat vane attached to one of the movable coils perpendicular to its axis.

The invention may be understood more readily from the following detailed description when considered in connection with the accompanying drawing and those features of the invention which are believed to be novel and patentable will be pointed out in the claims appended hereto. In the drawing Figure 1 is a diagrammatic representation partially in longitudinal vertical section of one embodiment of my invention. Figure 2 is a front view of the apparatus of Figure 1 showing the principal instrument unit. Figure 3 is a graph illustrating the principle of operation of the apparatus and Figures 4, 5 and 6 are additional graphs illustrating the principle employed in arriving at certain relationships in the design of the restraining torque element.

Referring now more in particular to Figure 1 which illustrates an arrangement for measuring the frequency of an alternating current circuit represented by a pair of conductors 11, I provide a principal or torque-producing instrument unit 12 and an auxiliary or restraining-torque-producing instrument unit 13. A pair of resonant circuits 14 and 15 is also provided which partially include the windings of the instrument units 12 and 13. The instrument units 12 and 13 each contain stationary elements and rotatable elements, which latter are carried by a shaft 16, which is rotatably mounted. The instrument unit 12 is of the long scale type having an angular range preferably exceeding 250 degrees and as much as 270 degrees in length. The instrument unit 12 may be of the iron core dynamometer type such as disclosed, for example, in the copending application of Almon J. Corson, Serial No. 236,891, filed October 25, 1938, and assigned to the same assignee as the present application. Instruments of this type comprise a core 17 of suitable permeable magnetic material, such as soft iron, or a suitable alloy such as 78.5% Ni and iron arranged to provide a complete magnetic circuit including an inner annular pole piece 18 and an outer pole piece 19 having a cylindrical face or inner surface surrounding so far as possible the inner annular pole piece 18 and spaced therefrom to form an annular air gap 20. The outer pole piece 19 or some other suitable portion of the magnetic field structure is adapted to carry a stationary current conducting winding structure, consisting in this case of a pair of coils 21 and 22. The inner annular pole piece 18 is made coaxial with the shaft 16 and a movable winding is provided in the form of a coil 23 linking the annular pole piece 18 and supported on one side by the shaft 16 so that the coil 23 is movable along the pole piece 18 with one edge sweeping through the air gap 20. The air gap 20 may be and preferably is of uniform length in order to give the instrument unit 12 a uniform scale law. This considerably simplifies the process of manufacture of the instrument 12 as compared with tapered air gap frequency measuring instruments of the ratio type utilizing the principle of comparison of currents in resonant circuits tuned to different frequencies. The instrument unit 12 may, in fact, be in all respects similar to a long scale dynamometer type watt meter or voltmeter except for the fact that the stationary winding structure has a mid tap or is divided into two parts consisting of the coils 21 and 22 in order to obtain a two-circuit arrangement. The stationary coils 21 and 22 are connected in series with the resonant circuit elements 14 and 15 respectively, and the series multiple combination as a unit is connected in series with the movable winding 23 and the instrument unit 13 to the conductors of the alternating current circuit 11 in which the frequency is to be measured.

The resonant circuit elements 14 and 15 may consist of inductance and capacitance in series in the customary manner and need not be described in detail. In accordance with the usual practice in frequency meters of the balance resonant-circuit type one of the resonant circuits is tuned to a frequency above the range of frequencies to be measured and the other resonant circuit is tuned to a frequency below the range of frequencies to be measured, and the divided coils 21 and 22 of the instrument are so connected that they act in opposition, with the current in one tending to drive the instrument down scale and the current in the other tending to drive the instrument up scale.

The restraining torque unit 13 resembles a dynamometer instrument of the type having a 90-degree scale in that it has a stationary current conducting coil 24 so mounted as to be substantially bisected by the axis of the shaft 16 having its magnetic axis perpendicular to the shaft 16, and has a movable coil 25 mounted upon the shaft 16 also having its magnetic axis perpendicular to the shaft. The restraining torque unit 13, however, includes also a vane 26 mounted upon the shaft 16 substantially in the plane of the movable coil 25 and perpendicular to the magnetic axis thereof. The current conducting coils 24 and 25 are connected in series so that they carry the same current as the movable coil 23 of the principal instrument unit and carry current proportional to the current in the coils 21 and 22 whereby the relationship between the main torque and the restraining torque, and the deflection of the instrument are independent of variations in voltage of the source 11.

It will be understood that in order to provide indications of the magnitude of the measured quantities there may be provided a movable pointer 27 carried by the shaft 16 and cooperating with a scale 28.

The instrument scale is so arranged that when the pointer 27 is in its mid-scale position the movable coil 23 is substantially in the position shown in Figures 1 and 2 and the movable coil 25 is substantially in the position shown in Figure 1, in which the coils 24 and 25 have their magnetic axes parallel. The connections of the coils are such that when the pointer 27 is deflected in either direction from its mid position 90 degrees or less the field produced by the coil 24 tends to rotate the movable coil 25 in the opposite direction from that in which the field tends to rotate the vane 26. The design is also such that the torque produced by the reaction between the relatively movable coils 24 and 25 is greater than that produced by the reaction between the stationary coil 24 and the vane 26. Furthermore, the arrangement is such that the net torque tends to oppose that produced by the principal instrument unit 12.

The principle of operation of the apparatus will be understood from a consideration of Figure 3 which is a graph showing the torques produced by the various elements of the instrument for a given voltage at various angular positions of the pointer; the mid position of the pointer, represented by the coil positions in Figures 1 and 2, being represented by the numeral 0 along the horizontal axis in Figure 3. The torques are plotted along the vertical axis and angles along the horizontal axis. The torque of the principal instrument unit 12 is relatively constant regardless of angular position for a given current difference between the coils 21 and 22 since the air gap 20 is substantially uniform. However, the variations in torque resulting from the variations in difference between current in the coils 21 and 22, due to variations in frequency, are substantially linear within the operating range of frequencies, and since a linear scale is desired the restraining torque should vary relatively linearly with angular deflection. Accordingly, the ideal restraining torque is represented by the straight line 29 intersecting the horizontal axis at the point 0 in the graph of Figure 3.

The torque due to the reaction between the coils 24 and 25 of the restraining torque unit 13 varies in accordance with the equation $T = E^2 \sin x$. Where, E represents the circuit voltage and $x$, the angular deflection from mid scale. The equation is represented by the sine wave 30 in Figure 3. The torque produced by the reaction between the coil 24 and the vane 26 is proportional to $E^2$ and $\sin 2x$ and may be represented by the curve 31 in Figure 3. For reasons to be explained hereinafter, preferably the design is such that the maximum torque of reaction between elements 24 and 26 is approximately $\frac{1}{16}$ that of the torque of reaction between coils 25 and 24, and the curve 31 represents the equation $T = \frac{1}{16} E^2 \sin 2x$. The resultant or net torque of the restraining torque unit 13 is the algebraic sum of the curves 30 and 31 and is represented by the dashed curve 32 in Figure 3. One may observe that the curve 32 is more nearly linear than either of the sine waves 30 or 31 and that its value becomes progressively greater to a point beyond the peak values of the sine wave 30 on either side of the mid scale position. In fact, the curve 32 tends to increase in scalar value for a distance of approximately 135 degrees either side of the mid point so as to give the scale substantially 270 degrees length without any point of instability.

Although my invention is not limited to providing the precise mathematical relationship between the torques of elements of the restraining torque unit 13 as shown in Figure 3 I find that satisfactory results are obtained by using this relationship. In Figures 4, 5 and 6 the first half of the curve of Figure 3 is shown at a somewhat enlarged scale, for different values of the ratio between the torque of the principal unit and the restraining torque unit. In Figure 4 the peak torque of the restraining torque unit is made ¼ that of the principal unit. It will be seen that the falling portion of the sine curve 30a tends to dominate toward the lower end of the scale, that is, at the end of the line 29, so that the resultant curve 32a rises to its maximum and drops off at an angular deflection of less than 240 degrees (120 degrees from center scale). In consequence, the instrument becomes unstable at the ends of the scale and for a value of frequency corresponding to a point beyond the peak of the curve 32a, the pointer will tend to float in some indeterminate position at the end of the scale although the measured value may subsequently vary to a different frequency.

The curves of Figure 5 represent the effect of designing the parts so that the peak torque of the restraining torque unit is ½ that of the principal unit. In this case the resultant curve 32b rises progressively to the ends of the scale of the instrument, so that the restraining torque is satisfactory at the ends of the scale, but departs materially from a linear scale near the mid position of the scale, near which the curve 32b rises very slowly. In consequence, the action of the instrument tends to be sluggish in the center band of the scale and the sluggishness may be sufficiently severe to result in instability.

By making the peak torque of the restraining torque unit $\frac{1}{10}$ that of the principal unit, as illustrated in Figures 6 and 3, the resultant curve of restraining torque 32 progresses linearly with sufficient fidelity for practical purposes so that rapid response and a very nearly uniform scale is obtained throughout the entire scale range of the instrument, which as shown may be as great as 270 degrees. Accordingly, when the maximum scale range is desired I prefer to utilize the design making the peak torque of the restraining torque unit approximately $\frac{1}{10}$ that of the principal unit.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. A long scale frequency responsive measuring instrument comprising in combination a dynamometer-type substantially linear-scale instrument unit having an angular range substantially as great as 250 degrees, said instrument unit having stationary and rotatable elements, one of which includes opposing current conducting coils, a second instrument unit of the modified dynamometer type having stationary and movable elements each including a current-conducting coil and adapted to react with the other in the manner of dynamometer-type instruments, one of said elements including also a relatively flat vane composed of permeable magnet material and mounted perpendicular to the magnetic axis of the coil of the same element, said second instrument unit being so designed that the maximum torque resulting from the presence of the vane has substantially four-tenths the maximum torque resulting from the interaction of the coils, the movable elements of the two instrument units being mechanically connected to act in opposition whereby the second instrument unit serves to provide restraining torque for the first instrument unit, and a pair of resonant circuits tuned above and below the average frequency expected to be measured, one of said resonant circuits being connected in series with one of the opposing current-conducting coils of the first instrument unit and the current conducting coils of the second instrument unit, the other resonant circuit being connected in series with the other of said opposing current-conducting coils of the first instrument unit and the current conducting coils of the second instrument unit, said circuits being adapted to be connected in parallel to an electrical circuit of which frequency is to be measured.

2. A long scale frequency responsive measuring instrument comprising in combination a dynamometer-type instrument having an angular range exceeding 180 degrees, said instrument unit having stationary and rotatable elements, one of which includes opposing current conducting coils, and the other of which includes a single current conducting coil, a second instrument unit of the modified dynamometer type having stationary and rotatable elements each including current conducting coils and adapted to react with the other in the manner of dynamometer-type instruments, one of said elements including also a relatively flat vane composed of permeable magnetic material and mounted perpendicular to the magnetic axis of the coil of the same element, the movable elements of the two instrument units being mechanically connected to act in opposition whereby the second instrument unit serves to provide restraining torque for the first instrument unit, and the mechanical relationship between the units being such that the magnetic axes of the coils of the second instrument unit are parallel when the first instrument unit is in the middle of its scale range, and a pair of resonant circuits tuned above and below the average frequency expected to be measured, one of said resonant circuits of the first instrument unit being connected in series with one of the current-conducting coils of the first instrument unit, the other circuit being connected in series with the second opposing current-conducting coil of the first instrument unit, and the aforesaid series connected circuits being connected in parallel, said parallel group being connected in series with the remaining current conducting coils of the instrument to a circuit in which the frequency is to be measured.

3. In a long scale frequency responsive measuring instrument a pair of mechanically connected opposing instrument units, the first instrument unit comprising a substantially linear long scale instrument unit including cooperating stationary and movable current-conducting windings with a magnetic core structure for causing the stationary winding to produce a magnetic flux of unchanged polarity for a given current direction with respect to the instrument axis throughout an angular range exceeding 180 degrees, the second of said instrument units being of a modified dynamometer type having a pair of relatively movable current conducting coils and attached to one of said coils a vane of permeable magnetic material perpendicular to the magnetic axis of said latter coil, the coils of said second instrument unit being connected in series with the windings of said first instrument unit.

4. In combination a long scale rotatable torque-producing unit with the operative angle of deflection exceeding 180 degrees and mechanically connected in opposition thereto a restraining torque unit comprising a pair of relatively rotatable elements, one of which carries a current-conducting winding structure and the other of which carries both a current conducting coil and a vane of magnetic material both adapted to react inductively with said current conducting winding structure whereby a restraining torque is produced which is a resultant of a single frequency and a double frequency sine wave obtained by plotting values of torque, measured along one axis, against angular positions of the restraining torque unit measured along another axis of rectangular coordinates.

5. In a long scale electrical measuring instrument a pair of mechanically connected opposing instrument units energized by the same current source, the first instrument unit comprising a long scale instrument unit including current conducting windings so arranged as to produce a torque varying substantially in accordance with the square of applied voltage and a magnetic core structure for the windings shaped to produce magnetic flux unchanged in polarity with respect to the instrument axis throughout an angular range exceeding 180 degrees, the second of said instrument units being of a modified dynamometer type having a pair of relatively movable current conducting coils and attached to one of said coils a vane of permeable magnetic material perpendicular to the magnetic axis of said latter coil.

RALPH M. ROWELL.

CERTIFICATE OF CORRECTION.

Patent No. 2,220,731.   November 5, 1940.

RALPH M. ROWELL.

It is hereby certified that error appears in the printed specification of the above numbered patent requiring correction as follows: Page 2, first column, line 20, for the word "balance" read --balanced--; and second column, line 36, strike out "and" after "$E^2$"; and that the said Letters Patent should be read with this correction therein that the same may conform to the record of the case in the Patent Office.

Signed and sealed this 31st day of December, A. D. 1940.

(Seal)

Henry Van Arsdale,
Acting Commissioner of Patents.